3,250,761
NEW SULFONAMIDES
Paul Schmidt, Therwil, and Kurt Eichenberger and Max Wilhelm, Basel, Switzerland, assignors to Ciba Corporation, New York, N.Y., a corporation of Delaware
No Drawing. Filed Jan. 15, 1963, Ser. No. 251,496
Claims priority, application Switzerland, Jan. 23, 1962, 787/62; July 9, 1962, 8,209/62; Dec. 4, 1962, 14,199/62
15 Claims. (Cl. 260—162)

The present invention relates to new sulfonamides. More especially it concerns 3-(para-amino-benzenesulfonamido)-5-pyridylpyrazoles of the formula

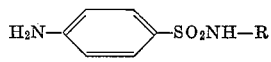

in which R represents a 5-pyridyl-pyrazolyl-(3) radical, their $N_4$-formaldehyde condensation products and the salts and $N_1$-acyl derivatives of the said compounds.

The invention relates primarily to those compounds which are substituted in position 2 of the pyrazole radical. The substituents may be, for example, substituted or unsubstituted hydrocarbon radicals or heterocyclic or heterocyclic-aliphatic radicals. A hydrocarbon radical may be, for example, a saturated or unsaturated aliphatic, alicyclic, alicycliyl-aliphatic, araliphatic or aromatic hydrocarbon radical, such as a lower linear or branched alkyl or alkenyl radical, for example methyl, ethyl, propyl, isopropyl, a linear or branched butyl, pentyl, hexyl or heptyl group which may be bound in any desired position, an allyl or methallyl group, a cycloalkyl or cycloalkenyl such as a cyclopentyl, cyclohexyl, cycloheptyl, cyclopentenyl, cyclohexenyl, a cycloalkyl-alkyl or cycloalkenyl-alkyl radical such as a cyclopentyl- or cyclohexenyl-methyl, -ethyl or -propyl group, an aralkyl- or aralkenyl- such as a phenyl-methyl, -ethyl-, -vinyl or -propyl radical, or aryl radicals, especially phenyl radicals, which may be substituted, for example, by alkyl or alkoxy radicals or by halogen atoms. Preferred heterocyclic or heterocyclyl-aliphatic radicals are those of the mononuclear kind, such as pyridyl or piperidyl radicals, for example N-alkyl-piperidyl-(4) groups.

Furthermore, there may be mentioned a possible substitution in position 4 of the pyrazole radical, for example by: Lower alkyls, phenyl radicals which may be substituted by lower alkyl or alkoxy groups or by halogen atoms. These, like the lower alkyl or alkoxy groups referred to above, are more especially methyl, ethyl, propyl, isopropyl, or linear or branched butyl, pentyl, hexyl or heptyl radicals which may be bound in any desired position, or the corresponding alkoxy radicals, and also halogen atoms, above all fluorine, chlorine, bromine or the pseudohalogen trifluoromethyl.

The pyridyl radical in 5-position may be substituted, for example, by alkyl or alkoxy groups or by halogen atoms.

As salts there may be mentioned, for example, metal salts, more especially those with alkali, alkaline earth or earth metals, such as sodium, potassium, calcium, magnesium or aluminium.

As $N_1$-acyl derivatives there may be mentioned primarily those in which the acyl radical is a lower aliphatic, an aromatic or araliphatic carboxylic acid radical, preferably the radical of a fatty acid, for example of a lower fatty acid, such as a carbalkoxy radical, for example the carbethoxy radical, the propionyl, butyryl, valeryl or caproyl radical, or the radical of a higher fatty acid, for example the lauroyl, palmityl or oleyl radical, or of a phenyl-fatty acid, such as the phenylacetic acid, or of a benzoic acid such as the benzoic acid itself. The acyl radical is, however, primarily the acetyl radical.

The term "$N_4$-formaldehyde condensation products" refers above all to those products which have been prepared, for example, by reacting 1 mol of formaldehyde with approximately 1 mol or 2 mols of para-amino-benzenesulfonamide The new sulfanilamides, their $N_4$-formaldehyde condensation products, and the salts and $N_1$-acyl derivatives of these compounds possess good chemotherapeutic properties with a prolinged action. For example, when administered to experimentally infected animals, such for instance as mice infected with streptococci or Staphylococci, they produce a very good curative effect. In their activity they surpass comparable compounds. They may therefore be used pharmacologically in animals, or as medicaments or prophylactics. They are also suitable as additives to animal fodder and may be used as intermediates in the manufacture of other valuable chemotherapeuticals.

Special mention deserve the compounds of the formula

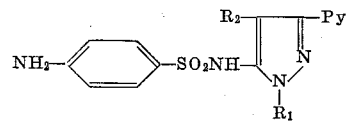

in which $R_1$ represents a lower alkyl radical, a benzyl radical, a phenyl radical or a pyridyl radical, Py stands for a pyridyl radical, and $R_2$ for hydrogen or a lower alkyl radical, e.g. methyl, their $N_4$-formaldehyde condensation products, and the salts and $N_1$-acyl derivatives of these compounds, and above all the particularly valuable 2-secondary butyl-3-(para-amino-benzenesulfonamido)-5-[pyridyl-(2)]-pyrazole, its $N_4$-formaldehyde condensation products, and the salts and $N_1$-acyl derivatives of these compounds.

The new compounds are obtained by known methods. According to a preferred embodiment a 3-amino-5-pyridyl-pyrazole is reacted with a para-$Z_1$-benzenesulfonyl halide in which $Z_1$ represents the amino group or a group convertible into the amino group, above all the chloride, and in the resulting compound, in any desired order of succession, a group convertible into the amino group is so converted and/or a resulting bis-para-$Z_1$-benzoylsulfonyl compound is split to form the mono-para-$Z_1$-benzenesulfonyl compound, and/or if desired a resulting compound is $N_1$-acylated, and/or in a resulting compound $N_1$-acyl groups are hydrolysed, and/or a resulting compound containing a free amino group is reacted with formaldehyde to form a formaldehyde condensation product.

The condensation of the para-$Z_1$-benzenesulfonyl halide with the 3-amino-5-pyridyl-pyrazole is carried out with the use of the usual condensing agents, for example an aqueous alkali such as an alkali metal carbonate, or above all a tertiary organic base such as aminopyrazole itself or pyridine, picoline, lutidine, collidine, a lower trialkylamine such as tri-methylamine or triethylamine, or an N:N'-tetra-alkyl-diaminoalkane, such for example as N:N'-tetramethyl-ω:ω'-diaminohexane, and, if desired, also with the use of a conventional diluent such as benzene, toluene, methylene chloride, chloroform, methylethyl ketone, acetone, dioxane, nitrobenzene or the like.

Depending on the conditions used in its performance—such as condensing agent, reaction temperature, diluent or the use of an excess of sulfonyl halide—the reaction referred to above yields bis-para-$Z_1$-benzenesulfonyl compounds as by-products or as main products, and they can be converted in known manner, before or after the possibly necessary steps of the conversion of $Z_1$ into the amino group, or if desired simultaneously, into mono-para-$Z_1$-benzenesulfonyl compounds. Inter alia, the bis-compounds are converted into the mono-compounds, for example by hydrolysis of aminoylsis, if desired simultaneously with a possible hydrolysis of the radical $Z_1$.

The afore-mentioned possible conversion of the radical $Z_1$ into the amino group follows the usual practice.

A radical $Z_1$ convertible into the amino group is above all a radical convertible into the amino group by reduction or hydrolysis. Radicals convertible into the amino group by hydrolysis are, for example, acylamino groups, above all aliphatic acylamino groups such as carbalkoxyamino groups, for example the carbethoxyamino group; alkanoylamino groups such as propionylamino, butyrylamino or caproylamino group, and above all the acetylamino group, dihalogen-phosphorylamino groups, for example, the dichlorophosphorylamino group or methylideneamino groups such, for example as alkylideneamino or benzylideneamino groups, above all the isopropylideneamino or benzylideneamino group. Accordingly, there may also be used starting materials of the formula

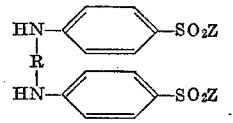

in which R stands for the acyl radical of a dibasic acid, above all of carbonic acid, or, for example, of an alkanedicarboxylic acid, and Z stands for halogen, especially chlorine.

A radical convertible into the amino group by reduction is, for example, an acylamino group capable of being split by hydrogenolysis, such as the carbobenzoxyamino group or the nitro group, or an azo group such as an arylazo or above all phenylazo group, and in the latter case a preferred starting material is a compound of the formula

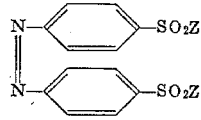

in which Z has the above meaning.

The hydrolysis, aminolysis and reduction of the aforementioned groups follow the usual practice.

According to a particularly valuable process para-acetylamino-benzenesulfonyl chloride is reacted with a 3-amino-5-pyridyl-pyrazole and the condensation product is hydrolysed.

The $N_1$-acylation is carried out in the conventional manner with the use of an $N_1$-acylating agent, above all with an acid anhydride or halide such as an acid chloride. The reaction is advantageously performed in the presence of a basic agent, such as an inorganic or organic base, for example an alkali metal carbonate or a tertiary amine such as pyridine, picoline, lutidine, collidine, trimethylamine, tributylamine, or 1:6-bis-dimethylaminohexane, and in the presence of an inert diluent, more especially of an organic solvent such as dioxane, benzene, toluene, a halogenated hydrocarbon, for example methylene chloride or chloroform, dimethylformamide, a lower aliphatic ketone such as acetone or methylethyl ketone, or if desired of the basic agent itself, such, for example, as pyridine, or a mixture thereof, more especially pyridine+acetone. It is of advantage to carry out the reaction in an agent which is as free from water as possible. When an acid halide is used, it is possible to use a metal salt of the sulfonamide, for example an alkali metal salt or, better still, the silver salt, in which case the addition of a basic agent as recommended above may be dispensed with, though there is no objection to their concomitant use, for example as diluent.

When performing the $N_1$-acylation of compounds in which $Z_1$ stands for the amino group, for example of a 3 - (para - amino - benzenesulfonamido) - 2 - phenyl - 5 - pyridyl-pyrazole, it must be ensured that the reaction takes place under mild conditions and with the use of approximately equimolecular proportions of the reactants in order to prevent the formation of $N_1:N_4$-bis-acyl compounds or, by acyl migration, of $N_4$-acyl compounds. It is therefore of advantage to perform the reaction at a low temperature, for example below 40° C., such as at 10 to 30° C., and in an anhydrous medium. When the acid halides are used it is of advantage to start from a metal salt of the sulfonamide, such as the silver salt.

When the acyl radical is introduced into the $N_1$-nitrogen atom of a compound in which $Z_1$ does not represent the amino group, it is preferable to start from a compound in which $Z_1$ represents a group which is converted into the amino group by reduction; this group is then reduced in known manner, advantageously under conditions that prevent hydrolysis and at elevated temperature to prevent the elimination or the additive combination of the $N_1$-acyl radical with the $N_4$-nitrogen atom. It is of special advantage to perform the reduction with hydrogen in the presence of a catalyst, for example a noble metal catalyst such as palladium on carbon.

A possible alternative starting material is a compound in which $Z_1$ is a radical that can be converted into the amino group by hydrolysis under mild conditions such, for example, as an arylmethylideneamino group, for example a benzylideneamino group. The arylmethylidene grouping can then be hydrolysed under mild conditions following upon the $N_1$-acylation without accompanying elimination of the $N_1$-acyl group.

The formaldehyde condensation products are obtained when a compound in which $Z_1$ represents the amino group, for example a 2-phenyl-3-(para-amino-benzenesulfonamido)-5-pyridyl-pyrazole or an acyl derivative thereof, is reacted with formaldehyde in the presence of a dilute acid. Instead of formaldehyde there may be used a compound that gives off formaldehyde, such as paraformaldehyde or hexamethylenetetramine. The reaction is advantageously carried out in the presence of water and at room temperature or at a moderately raised temperature. Suitable acids are above all strong inorganic acids, such as hydrohalic acids, sulfuric, perchloric or phosphoric acid or the like.

From the new aminobenzenesulfonamides that contain a hydrogen atom attached to the $N_1$-nitrogen atom there may be prepared salts in the usual manner, for example by reaction with bases, such as hydroxides of alkali, alkaline earth or earth metals, for example with the hydroxides of sodium, potassium or calcium, or with organic bases.

The salts of the sulfonamides may also be used for purifying the resulting sulfonamides by converting the sulfonamides into the salts, separating the latter and again liberating the sulfonamides from the salts.

Except for 3-amino-5-pyridyl-(3)-pyrazole the starting materials are new. They are obtained by known methods, as described, for example, in U.S. patent applications No. 167,167, filed January 18, 1962, now U.S. Patent 3,169,966, No. 239,358, filed November 21, 1962, and No. 240,198, filed November 21, 1962. It is of advantage to react a pyridyl-ketone that contains in the α-position relatively to the carbonyl group at least one hydrogen atom and a nitrile group or a modified carboxyl group containing a reactive imino group, such as an iminoether, amidine or a $Z_1$-benzenesulfonyl-carbamyl group, being for example an (α-cyonoalkanoyl)-pyridine, with a hydrazine containing at least 3 hydrogen atoms. For this purpose the carbonyl group may be in a reactive, modified form, for example in the enolate or ketal form.

The reaction is performed in known manner, advantageously in the presence of a diluent and, if desired, at an elevated temperature and/or in the presence of a condensing agent, for example a strong acid such as hydrochloric acid, an arylsulfonic or similar acid.

The aforementioned processes may also be performed with the use of such derivatives of the starting materials as are converted into these starting materials under the reaction conditions.

The invention further includes any modification of the present process in which an intermediate obtainable at any stage of the process is used as starting material and any remaining step or steps is/are carried out or the process is discontinued at any stage thereof, or in which a starting material is formed under the reaction conditions or is used in the form of a salt thereof.

Thus, for example, a 3-amino-5-pyridyl-pyrazole may be manufactured in known manner and reacted with a para-$Z_1$-benzenesulfonyl halide without isolation.

Another object of the invention is the new intermediates, such as the mono- and bis-para-$Z_1$-benzenesulfonyl-3-amino-5-pyridyl-pyrazoles.

The new compounds may be used as medicaments, for example in the form of pharmaceutical preparations which contain the active ingredient in admixture or conjunction with an organic or inorganic, solid or liquid pharmaceutical excipient suitable for enteral, parenteral or local administration. Suitable excipients are substances that do not react with the new compounds such, for example, as water, gelatine, lactose, starches, colloidal silicic acid, magnesium stearate, talcum, vegetable oils, benzyl alcohols, gums, polyalkylene glycols, white petroleum jelly, cholesterol or other known medicinal excipients. The pharmaceutical preparations may be, for example, tablets, dragees, ointments or creams, or in liquid form solutions, suspensions or emulsions. They may be sterilized and/or may contain assistants such as preserving, stabilizing, wetting or emulsifying agents, salts for regulating the osmotic pressure or buffers. They may also contain other therapeutically valuable substances. The preparations are formulated by known methods. For oral administration they contain the new sulfonamides in an amount of over 0.1 g., advantageously from 0.25 to 3 grams, per dosage unit. The new active compounds may also be used in veterinary medicine in the form of veterinary preparations or as additives to animal fodder. Accordingly, the invention includes also the said veterinary medicaments and the animal fodders or the additives to animal fodder containing the new sulfonamides of the kind described in admixture with the usual vehicles.

The following examples illustrate the invention.

Example 1

19.2 g. of para-acetylamino-benzenesulfonyl chloride of 92% strength are stirred within 30 minutes into 16.2 g. of 2-phenyl-3-amino-5-[pyridyl-(4)]-pyrazole in 55 cc. of pyridine. When the reaction has subsided, the batch is heated for 1 hour at an internal temperature of 90–95° C. The reaction solution is then poured into 550 cc. of 2 N hydrochloric acid. The water is decanted from the smeary precipitate which is then refluxed for 2½ hours with 410 cc. of 2 N-sodium hydroxide solution. The reaction solution is treated with carbon and filtered. The filtrate is adjusted with 5 N-hydrochloric acid to pH=6. The crystals formed are recrystallized from alcohol and yield 2 - phenyl-3-(para-amino-benzenesulfonamido) - 5-[pyridyl-(4)]-pyrazole of the formula

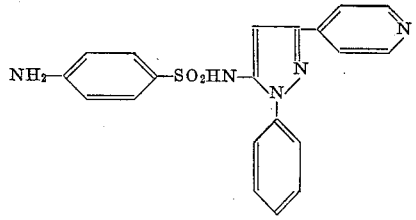

melting at 238–240° C.

2-phenyl - 3 - amino-5-[pyridyl-(4)]-pyrazole used as starting material may be prepared in the following way:

A solution of 10 g. of isonicotinoyl-acetonitrile, 10 g. of phenylhydrazine and 3 cc. of concentrated hydrochloric acid in 100 cc. of ethanol is refluxed for 8 hours and then alkalinized by adding 2 N-sodium hydroxide solution. On addition of water a precipiate forms which is recrystallized from aqueous methanol, to yield crystalline 2-phenyl-3-amino-5-[pyridyl-(4)]-pyrazole melting at 154–155° C.

Example 2

14 g. of para-acetylamino-benzenesulfonyl chloride of 92% strength are stirred within 30 minutes into 10.8 g. of 2-(secondary butyl)-3-amino-5-[pyridyl-(2)]-pyrazole in 40 cc. of pyridine, during which the temperature rises to about 45° C., whereupon the batch is stirred for 1 hour longer at an internal temperature of 90–95° C. After cooling, the reaction solution is poured into 2 N-hydrochloric acid and the precipitated crystals are suctioned off and recrystallized from aqueous alcohol. The resulting 2-(secondary butyl)-3-(para-acetylamino-benzenesulfonamido)-5-[pyridyl-(2)]-pyrazole melts at 246–248° C. 10 g. of this product in 150 cc. of 2 N-sodium hydroxide solution are refluxed for 2½ hours, then cooled, and the solution is treated with carbon, filtered and acidified with 2 N-hydrochloric acid, whereupon 2-secondary butyl-3-(para - amino-benzenesulfonamido)-5-[pyridyl-(2)]-pyrazole of the formula

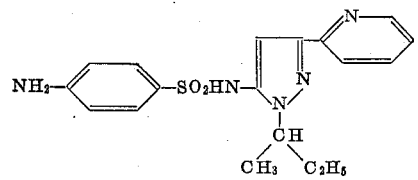

settles out; it melts at 210–212° C.

The starting material can be prepared in the following way:

A mixture of 14.6 g. of pyridoyl-(2)-acetonitrile, 9.6 g. of secondary butylhydrazine and 150 cc. of absolute alcohol is refluxed for 10 hours. The alcoholic solution is clarified with carbon and concentrated until crystallization sets in, and the precipitated crystals are suctioned off, to yield 2-(secondary butyl)-3-amino-5-[pyridyl-(2)]-pyrazole melting at 120–122° C.

Example 3

13.4 g. of para-acetylamino-benzenesulfonyl chloride of 96% strength are stirred within 30 minutes into 10.8 g. of 2-(secondary butyl)-3-amino5-[pyridyl-(4)]-pyrazole in 40 cc. of pyridine, and the batch is stirred for 1 hour longer at 90–95° C. After cooling the reaction solution is poured into 200 cc. of 2 N-hydrochloric acid, whereupon a smeary paste settles out. The water is decanted and the paste is refluxed for 2½ hours in 150 cc. of 2 N-sodium hydroxide solution. After cooling, the solution is treated with carbon, filtered and adjusted with 2 N-hydrochloric acid to pH=6, whereupon 2-(secondary butyl)-3-(para-aminobenzenesulfonamido) - 5 - [pyridyl-(4)]-pyrazole of the formula

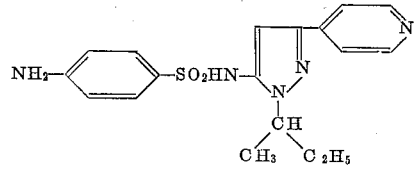

settles out. It turns transparent at 110° C. and melts at 165–170° C.

The above-mentioned 2-secondary butyl-3-amino-5-pyridyl-(4)-pyrazole may be prepared as follows:

A mixture of 14.6 g. of isonicotinoyl-acetonitrile, 9.6 g. of secondary butylhydrazine and 150 cc. of absolute alcohol is refluxed for 10 hours. The alcoholic reaction solution is clarified with carbon and evaporated to dryness, and the residue is recrystallized from aqueous methanol, to yield 2-(secondary butyl)-3-amino-5-[pyridyl-(4)]-pyrazole melting at 136–137° C.

Example 4

13.4 g. of para-acetylamino-benzenesulfonyl chloride of 96% strength are stirred within 30 minutes into 11.5 g. of 2-(secondary butyl)-3-amino-4-methyl-5-[pyridyl-(4)]-pyrazole in 40 cc. of absolute pyridine. When the reaction has subsided, the batch is stirred on for 1 hour at an internal temperature of 90–95° C. After cooling, the reaction solution is poured into 2-N-hydrochloric acid, whereupon a smeary paste settles out. The water is decanted and the paste is refluxed for 2½ hours in 150 cc. of 2 N-sodium hydroxide solution. After cooling, the recation solution is treated with carbon, filtered and acidified with 2 N-hydrochloric acid, whereupon 2-(seconary-butyl)-3-(para-amino-benzenesulfonamido)-4-methyl-5-[pyridyl-(4)]-pyrazole hydrate of the formula

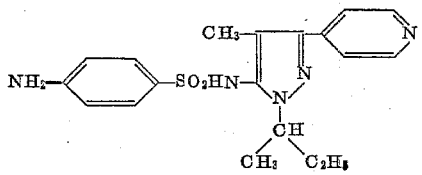

settles out; it turns transparent at 138° C. and melts at 175–180° C.

The starting material is prepared as follows:

A mixture of 16 g. of α-(isonicotinoyl)-propionitrile, 10.3 g. of secondary butylhydrazine of 94% strength and 200 cc. of absolute ethanol is refluxed for 10 hours, and the ethanolic reaction solution is then evaporated to dryness. The residue is recrystallized from ether+petroleum ether, to yield 2-(secondary butyl)-3-amino-4-methyl-5-[pyridyl-(4)]-pyrazole melting at 86–87° C.

The starting material, α-(isonicotinoyl)-propionitrile, may be prepared as follows:

500 cc. of absolute ethanol are slowly dropped into 46 g. of sodium in 1.5 liters of boiling toluene. When the sodium has dissolved, 620 cc. of an ethanol+toluene mixture are distilled off and another 300 cc. of absolute toluene are added. The reaction solution is then allowed to cool to 90° C., 200 g. of isonicotinic acid ethyl ester and 162 g. of propionitrile are added, and the mixture is refluxed for 7 hours. After cooling, water is added and the toluene layer is separated. When 326 cc. of 6.12 N-hydrochloric acid are added, α-isonicotinoyl-propionitrile settles out.

Example 5

In the course of 30 minutes, 8.5 g. of para-acetylamino-benzenesulfonyl chloride are added to 8.5 g. of 2-benzyl-3-amino-5-[pyridyl-(4)]-pyrazole in 51 cc. of pyridine, and the mixture stirred for 1 hour longer at 90–95° C. The reaction solution is poured into 350 cc. of water and 200 g. of ice, the supernatant liquid decanted from the precipitated product, and the latter boiled under reflux for 2½ hours in 250 cc. of 2 N-sodium hydroxide solution. The reaction solution is treated with charcoal and then filtered. The filtrate is given a pH of 5.5 with 2 N-hydrochloric acid, the crystals that precipitate are filtered off with suction and recrystallized from alcohol. There is obtained the 2-benzyl-3-(para-aminobenzenesulfonamido)-5-[pyridyl-(4)]-pyrazole of the formula

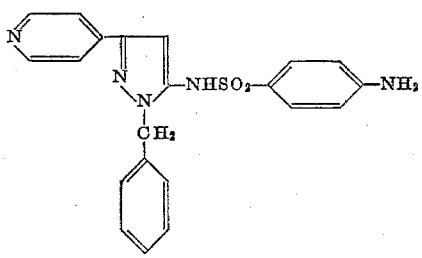

which melts at 257–258° C.

Example 6

In the course of 30 minutes, 28 g. of para-acetylamino-benzenesulfonyl chloride of 92% strength are added to 27.1 g. of 2-(para chlorophenyl)-3-amino-5-[pyridyl-(4)]-pyrazole in 80 cc. of pyridine, and the mixture heated for 1 hour at 90–95° C. The reaction solution is then poured into 400 cc. of 2 N-hydrochloric acid and 400 g. of ice. The crystals that precipitate are filtered off with suction and refluxed for 2½ hours in 500 cc. of 2 N-sodium hydroxide solution. The solution is treated with carbon while still warm, filtered, and given a pH of 5 with 2 N-hydrochloric acid. The crystals which precipitate are recrystallized from alcohol. There is obtained the 2-(para-chlorophenyl)-3-(para-aminobenzene-sulfonamido)-5-[pyridyl-(4)]-pyrazole of the formula

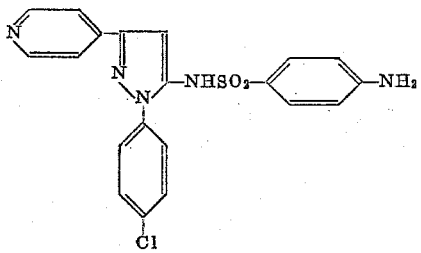

melting at 265–267° C.

The 2-(para-chlorophenyl)-3-amino-5-[pyridyl-(4)]-pyrazole used as starting material is prepared as follows:

43.8 g. of 4-pyridoyl-acetonitrile and 42.75 g. of (para-chlorophenyl)-hydrazine-hydrochloride are refluxed for 8 hours in 300 cc. of absolute alcohol and 3 cc. of concentrated hydrochloric acid. The reaction solution is evaporated and the residue treated with 500 cc. of water, rendered alkaline with 2 N-sodium hydroxide solution, and extracted with chloroform. The chloroform is evaporated and the residue recrystallized from alcohol. There is obtained the 2-(para-chlorophenyl)-3-amino-5-[pyridyl-(4)]-pyrazole of the formula

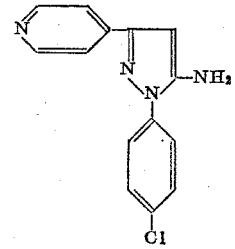

which melts at 147–148° C.

Example 7

14 g. of para-acetylamino-benzenesulfonyl chloride are added to a solution of 10 g. of 2-[pyridyl-(2)]-3-amino-5-[pyridyl-(4)]-pyrazole in 75 cc. of pyridine. The mixture is stirred well and then allowed to stand at room temperature for 4 hours. 200 cc. of water are then added, and the resulting precipitate filtered off. The latter is dried for 2 hours with 2 N-sodium hydroxide solution, neutralized by an addition of hydrochloric acid 1:1, the resulting precipitate filtered off and purified by recrystallization from alcohol+water 1:1. There is obtained the 2-[pyridyl-(2)]-3-(para-aminobenzenesulfonamido)-5-[pyridyl-(4)]-pyrazole of the formula

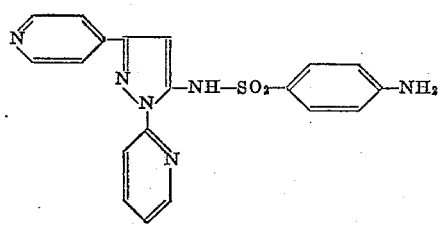

which melts at 235–237° C.

The 2-[pyridyl-(2)]-3-amino-5-[pyridyl-(4)]-pyrazole used as starting material is prepared as follows:

10 g. of isonicotinoyl-acetonitrile are added to a solution of 9 g. of 2-hydrazinopyridine in 75 cc. of ethanol. The mixture is refluxed for 6 hours, then evaporated to dryness. The residue is recrystallized from water. There is obtained the 2-[pyridyl-(2)]-3-amino-5-[pyridyl-(4)]-pyrazole of the formula as white crystals of melting point 138–140° C.

Example 8

In the course of 3 minutes, 0.71 cc. of acetic anhydride is stirred into 2.78 g. of 2-(secondary butyl)-3-(para-aminobenzenesulfonamido) - 5 - [pyridyl-(2)]-pyrazole in 20 cc. of acetone and 1.2 cc. of pyridine, and the mixture stirred at room temperature for 5 hours. After 12 hours, the reaction solution is treated with 20 cc. of 1% ammonia solution, 200 cc. of water are added, and the whole left to itself for about 10 hours, after which the crystals that have formed are filtered off with suction. The latter are recrystallized from ether to obtain the $N_1$-acetyl-2-(secondary butyl)-3-(para-aminobenzenesulfonamido)-5-[pyridyl-(2)]-pyrazole of the formula melting at 198–199° C.

Example 9

2-secondary butyl-3-(para-aminobenzenesulfonamido)-5-[pyridyl-(2)]-pyrazole, wheat starch, and a paste from colloidal silicic acid and hydrolized starch are made up into a plastic mass, and the latter granulated. After drying at 50° C., the grains are adjusted to the usual size, and arrowroot, magnesium stearate and talcum added as outer phase, and the mass tableted.

Tablets having e.g. the composition given below can be made by using appropriate proportions of the above substances.

| | Mg. |
|---|---|
| 2-secondary butyl-3-(para-aminobenzene-sulfonamido)-5-[pyridyl-(2)]-pyrazole | 500.0 |
| Colloidal silic acid with hydrolized starch | 30.0 |
| Wheat starch | 30.0 |
| Arrowroot | 40.0 |
| Magnesium stearate | 5.0 |
| Talcum | 20.0 |
| | 625.0 |

We claim:

1. A member selected from the group consisting of compounds of the formula in which $R_1$ stands for a member selected from the group consisting of hydrogen, lower alkyl, lower alkenyl, cyclo-lower alkyl, cyclo-lower alkenyl, cyclo-lower alkyl-lower alkyl, cyclo-lower alkyl-lower alkenyl, R-phenyl-lower alkyl, R-phenyl-lower alkenyl, R-phenyl, pyridyl, piperidyl and N-lower alkyl-piperidyl, R being a member selected from the group consisting of hydrogen, lower alkyl, lower alkoxy and halogen, $R_2$ stands for a member selected from the group consisting of hydrogen, lower alkyl, phenyl, lower alkylphenyl, lower alkoxyphenyl and halogenphenyl, Py stands for a member selected from the group consisting of pyridyl, lower alkylpyridyl, lower alkoxypyridyl, halogenopyridyl and $R_3$ stands for a member selected from the group consisting of hydrogen, alkanoyl having up to 18 carbon atoms, lower carbalkoxy, phenyl lower alkanoyl, benzoyl, $N_4$-formaldehyde condensation products thereof, and alkali metal, alkaline earth metal and earth metal salts of these compounds.

2. A member selected from the group consisting of compounds of the formula wherein $R_1$ represents a member selected from the group consisting of lower alkyl, benzyl, phenyl, lower alkylphenyl, lower alkoxyphenyl, halogenophenyl and pyridyl, Py stands for pyridyl, and $R_2$ for a member selected from the group consisting of hydrogen and lower alkyl, and $N_4$-formaldehyde condensation products thereof and alkali metal, alkaline earth metal and earth metal salts and $N_1$-acyl derivatives of these compounds in which acyl is a member selected from the group consisting of alkanoyl having 2 to 18 carbon atoms, benzoyl, phenyl-lower alkanoyl and carbo-lower alkoxy.

3. 2-secondary butyl - 3 - (para-amino-benzenesulfonamido)-5-[pyridyl-(2)]-pyrazole.

4. A member selected from the group consisting of an alkali metal, alkaline earth metal and earth metal salt of the compound claimed in claim 3.

5. An $N_4$-formaldehyde condensation product of the compound claimed in claim 3.

6. An $N_1$-lower alkanoyl derivative of the compound claimed in claim 3.

7. 2-phenyl - 3 - (para-amino-benzenesulfonamido)-5-[pyridyl-(4)]-pyrazole.

8. 2-secondary butyl - 3 - (para-amino-benzenesulfonamido)-5-[pyridyl-(4)]-pyrazole.

9. 2-secondary butyl - 3 - (para-aminobenzenesulfonamido)-4-methyl-5-[pyridyl-(4)]-pyrazole.

10. 2-benzyl - 3 - (para-aminobenzene sulfonamido)-5-[pyridyl-(4)]-pyrazole.

11. 2-(para-chlorophenyl) - 3 - (para-aminobenzenesulfonamido)-5-[pyridyl-(4)]-pyrazole.

12. 2-[pyridyl-(2)] - 3 - (para-aminobenzenesulfonamido)-5-[pyridyl-(4)]-pyrazole.

13. $N_1$-acetyl-2-(secondary butyl)-3-(para-aminobenzenesulfonamido)-5-[pyridyl-(2)]-pyrazole.

14. A member selected from the group consisting of compounds of the formula in which $R_1$ stands for a member selected from the group consisting of hydrogen, lower alkyl, lower alkenyl, cyclo-lower alkyl, cyclo-lower alkenyl, cyclo-lower alkyl-lower alkyl, cyclo-lower alkyl-lower alkenyl, R-phenyl-lower alkyl, R-phenyl-lower alkenyl, R-phenyl, pyridyl, piperidyl and N-lower alkyl-piperidyl, R being a member selected from the group consisting of hydrogen, lower alkyl, lower alkoxy and halogen, $R_2$ stands for a member selected from the group consisting of hydrogen, lower alkyl, phenyl, lower alkylphenyl, lower alkoxyphenyl and halogenphenyl, Py stands for a member selected from the group consisting of pyridyl, lower alkylpyridyl, lower alkoxypyridyl, halogenopyridyl and $Z_1$ stands for a member selected from the group consisting of acylamino, azo and nitro.

15. A member selected from the group consisting of compounds of the formula

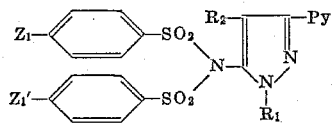

in which $R_1$ stands for a member selected from the group consisting of hydrogen, lower alkyl, lower alkenyl, cyclo-lower alkyl, cyclo-lower alkenyl, cyclo-lower alkyl-lower alkyl, cyclo-lower alkyl-lower alkenyl, R-phenyl-lower alkyl, R-phenyl-lower alkenyl, R-phenyl, pyridyl, piperidyl and N-lower alkyl-piperidyl, R being a member selected from the group consisting of hydrogen, lower alkyl, lower alkoxy and halogen, $R_2$ stands for a member selected from the group consisting of hydrogen, lower alkyl, phenyl, lower alkylphenyl, lower alkoxyphenyl and halogenphenyl, Py stands for a member selected from the group consisting of pyridyl, lower alkylpyridyl, lower alkoxypyridyl, halogenopyridyl and $Z_1$ and $Z_1'$ each stands for a member selected from the group consisting of acylamino, azo and nitro.

References Cited by the Examiner

UNITED STATES PATENTS 3,014,038   12/1961   Druey et al. _____ 260—294.8

OTHER REFERENCES

Hodgins et al.: Ind. & Eng. Chem., vol. 33, pages 769 to 772 (1941).

WALTER A. MODANCE, *Primary Examiner.*

JOHN D. RANDOLPH, *Examiner.*